United States Patent
Nielsen et al.

(10) Patent No.: US 11,499,853 B2
(45) Date of Patent: Nov. 15, 2022

(54) MODULAR ULTRASONIC CONSUMPTION METER

(71) Applicant: Kamstrup A/S, Skanderborg (DK)

(72) Inventors: Søren Tønnes Nielsen, Skanderborg (DK); Peter Schmidt Laursen, Skanderborg (DK); Kaspar Raahede Aarøe, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 209 days.

(21) Appl. No.: 16/952,175

(22) Filed: Nov. 19, 2020

(65) Prior Publication Data

US 2021/0148742 A1 May 20, 2021

(30) Foreign Application Priority Data

Nov. 19, 2019 (DK) .......................... PA 2019 70703

(51) Int. Cl.
*G01F 1/66* (2022.01)
*G01F 1/667* (2022.01)
*G01F 15/063* (2022.01)

(52) U.S. Cl.
CPC ............ *G01F 1/667* (2013.01); *G01F 15/063* (2013.01)

(58) Field of Classification Search
None
See application file for complete search history.

(56) References Cited

U.S. PATENT DOCUMENTS 9,482,565 B2 * 11/2016 Brockhaus .............. G01F 1/588
10,267,663 B2 * 4/2019 Skelding ................ E21B 21/01
(Continued)

FOREIGN PATENT DOCUMENTS

EP 0131732 B1 9/1990
EP 1866605 A2 12/2007
(Continued)

OTHER PUBLICATIONS

Search Report dated Apr. 29, 2020, for Danish Priority Application No. PA 2019 70703.
(Continued)

*Primary Examiner* — Harshad R Patel
(74) *Attorney, Agent, or Firm* — Renner, Otto, Boisselle & Sklar, LLP (57) ABSTRACT

A consumption meter arranged to measure a flow rate of a fluid, comprising: a tube with for passage of the fluid between an inlet and an outlet, multiple individual flow meters arranged at the tube to measure a sub-flow rate of the fluid, a first control circuit and communication interface arranged for receiving the measured sub-flow rate from each of the multiple flow meters, and being arranged to generate a signal indicative of the flow rate of the fluid according to the received sub-flow rates, each of the multiple individual flow meters comprising: a flow meter housing arranged at the tube; first and second ultrasonic transducers arranged in the flow meter housing for transmitting and receiving ultrasonic signals propagating through the fluid; a second control circuit arranged for operating the first and second ultrasonic transducers, and being arranged to generate the signal indicative of the sub-flow rate of the fluid accordingly; and a communication interface arranged for transmitting the signal indicative of the sub-flow rate to the first control circuit.

15 Claims, 3 Drawing Sheets

(56) References Cited

U.S. PATENT DOCUMENTS

| | | | |
|---|---|---|---|
| 2002/0189341 A1* | 12/2002 | Schwartz | G01F 7/00 |
| | | | 73/197 |
| 2010/0005900 A1* | 1/2010 | Straub, Jr. | G01F 1/662 |
| | | | 702/48 |
| 2013/0080080 A1 | 3/2013 | Forbes | |
| 2013/0340519 A1 | 12/2013 | Kurth et al. | |
| 2014/0123727 A1* | 5/2014 | Weinstein | G01F 1/8477 |
| | | | 73/1.16 |
| 2014/0343736 A1* | 11/2014 | Meyer | G05D 7/0635 |
| | | | 700/282 |
| 2015/0198471 A1 | 7/2015 | Furlong | |
| 2019/0033261 A1 | 1/2019 | Nielsen | |
| 2019/0195671 A1 | 6/2019 | Bottner et al. | |
| 2019/0226893 A1 | 7/2019 | Kuhlemann | |

FOREIGN PATENT DOCUMENTS

| | | |
|---|---|---|
| EP | 1393281 B1 | 11/2017 |
| WO | 2006/110362 A2 | 10/2006 |

OTHER PUBLICATIONS

European Search Report dated Apr. 23, 2021, for related patent Application No. 20208264.0.

* cited by examiner

MODULAR ULTRASONIC CONSUMPTION METER

This application claims priority to DK Patent Application No. PA 2019 70703 filed Nov. 19, 2019, which is hereby incorporated herein by reference.

FIELD OF THE INVENTION

The present invention relates to the field of ultrasonic consumption meters. More specifically it relates to the field of ultrasonic consumption meters, or utility meters, comprising an ultrasonic flow meter, such as ultrasonic consumption meters for measuring consumption data of a supplied utility, e.g. water, gas, heat, or cooling.

BACKGROUND OF THE INVENTION

Ultrasonic consumption meters are used for precision measurement of fluid flow in connection with consumption meters for measuring a consumed quantity of a supplied utility (e.g. heat, cooling or water). An ultrasonic consumption meter measures transit times of ultrasonic signals so as to determine a flow rate of a fluid flowing in a flow channel by use of known operation principles for transit time flow meters.

A consumption meter may simply measure the consumed amount, e.g. a volume of water, and utility companies may base the billing of the consumers on this amount. However, for heat and cooling meters, temperature sensors are used for measuring the temperature of the fluid, whereby the consumer may be billed in accordance with energy extracted from the supplied liquid. Such ultrasonic consumption meters may be used in connection with district heating, district cooling and/or distributed water supply.

A typical ultrasonic flow meter, used as part of a consumption meter has a meter housing with a control circuit inside which is electrically connected to two or more spaced apart ultrasonic transducers, e.g. piezo electric transducers. The ultrasonic transducers are mounted on the flow channel in a way so that ultrasonic signals can be introduced into the fluid in the flow channel, by one of the ultrasonic transducers, and travel along a measuring section to be detected by the other ultrasonic transducer after the passage. The operation of the ultrasonic transducers is controlled by the control circuit, which is galvanic connected to the transducers.

Especially for larger flow meters, the flow profile of the fluid inside flow channel may vary significantly depending on the piping connected to the flow meter, flow speed etc. Thus, for large meters requiring high precision measurements of the flow, multiple sets of ultrasonic transducers are often required. The multiple sets of ultrasonic transducers are distributed over flow channel to cover different parts of the flow channel cavity. The ultrasonic transducers are normally electrically connected to the control circuit inside the meter housing, through a number of cables, which must be long enough to connect transducers placed away from the measurement circuit. The signals propagating in the cables are analogue signals which may be distorted in the cable due to the characteristics of the cable or due to noise which is electromagnetically coupled to the cable. The measurement circuit will determine the flow rate based on the analogue signals received from all the ultrasonic transducers.

The meter housing enclosing the measurement circuit, is preferably watertight, so as to avoid any humidity causing damage to the measurement circuit inside the meter housing. The cables connecting the ultrasonic transducers and the measurement circuits do however provide a potential channel for leading water into the meter housing. In case of just a minor damage to the cables, such as the cable outer layer the cables will provide a channel allowing water to enter the meter housing. Especially water meters may be submerged or operate in high humidity environments but heat and cooling meters may as well operate in humid environments.

The flow channel of prior art meters is typically a special made element, made from a metal such as brass, stainless steel or cast iron. The flow channel often has a mounting-seat for a transducer housing. The mounting-seat may be a plane surface on the inside or outside of the flow channel or a threaded element for fixating the transducer housing. In order to introduce ultrasonic signals into a metal flow channel, the transducer housing is mounted in openings of the wall of the flow channel. Cabling connecting the ultrasonic transducer to the control circuit, exits the transducer housing and enters the meter housing. Further mounting elements for mounting the meter housing, containing control circuits for the meter, are provided on the flow channel. The flow channel is often an element produced specifically for the meter requiring different production processes such as moulding and machining and varying moulds for each dimension of flow meters. Alternatively the flow channel is made from a prefabricated tube having dimensions adequate for the flow meter being produced. This is especially the case for large dimension meters. The prefabricated tube is a standard element that only needs to be cut out in the right length, which eliminates the need for costly special tools and processes associated with production of the flow channel. However, the standard tube will need holes and mounting-seats for the transducer housings and the meter housing. To create a mounting-seat, a section is cut out of the tube wall and a new section including a surface for reception of the transducer assemblies is welded in the place of the cut out section. Producing a flow channel is an expensive process adding significantly to the total meter cost.

Consumption meters typically require a large number of single components which complicates the assembly process. Thus prior art consumption meter housings involve complex connection structures for electrically connecting the transducers and the measurement circuitry of the consumption meter, such as complex wiring structures and/or separate electrically connecting elements, which complicates the assembly process.

Hence, an improved consumption meter would be advantageous, and in particular a more cost efficient modular consumption meter made from standard elements would be advantageous. Further, the consumption meter must be robust and suitable for operation in a high humidity environment. Providing a consumption meter allowing simple and economic production methods, and allowing for preproduced modular sub-assemblies being put together in a final step of production, will be advantageous.

OBJECT OF THE INVENTION

An object of the present invention is to provide an alternative to the prior art.

In particular, it may be seen as a further object of the present invention to provide a consumption meter that solves the above mentioned problems of the prior art and improve known consumption meters in respect of production processes, robustness, component cost, modularity and water resistance.

SUMMARY OF THE INVENTION

Thus, the above described object and several other objects are intended to be obtained in a first aspect of the invention by providing a consumption meter arranged to measure a flow rate of a fluid, the consumption meter comprising: a tube with a through-going opening for passage of the fluid between an inlet and an outlet; multiple individual flow meters arranged at the tube to generate a signal indicative a sub-flow rate of the fluid; and a first control circuit comprising a communication interface arranged for receiving the signal indicative of the sub-flow rate from each of the multiple flow meters, and being arranged to generate a signal indicative of the flow rate of the fluid according to the received sub-flow rates, each of the multiple individual flow meters comprising: a flow meter housing arranged at the tube; first and second ultrasonic transducers arranged in the flow meter housing for transmitting and receiving ultrasonic signals propagating through the fluid; a second control circuit arranged for operating the first and second ultrasonic transducers, and being arranged to generate the signal indicative of the sub-flow rate of the fluid accordingly; and a communication interface arranged for transmitting the signal indicative of the sub-flow rate to the first control circuit, wherein the flow meters are arranged on the same longitudinal section of the tube or on at least overlapping longitudinal sections of the tube.

The invention is particularly, but not exclusively, advantageous for obtaining a robust modular consumption meter comprising multiple individual sealed and water tight modules in form of individual flow meters.

The individual flow meters each comprising the second control circuit, communication interface and ultrasonic transducers inside the flow meter housing has the advantage that each flow meter is an individual robust self-contained unit capable of measuring a sub-flow rate independent of any other element of the consumption meter. A meter comprised by such robust modules has the advantages of increased robustness and simpler manufacturing processes.

Each individual flow meter covers different sections of the tube, whereby multiple measurement paths are created which has the advantage of increased measurement accuracy. The flow meters being arranged on the same or at least overlapping longitudinal sections of the flow tube has the advantage of increased measurement accuracy in that the flow profile may change along the longitudinal direction of the flow tube.

Individual flow meters are to be construed as flow meters arranged to operate and measure a flow rate independent of other flow meters. A sub-flow rate is a flow rate measured over a path of propagation of the ultrasonic signal inside the tube by a single independent flow meter. As such a sub-flow rate is an independent measure of the flow rate in the tube. The individual flow meters have a second control circuit arranged to operate the first and second ultrasonic transducers of the individual flow meter to transmit and receive ultrasonic signals through the fluid of the tube. The second control circuit is further arranged to generate the signal indicative of the sub-flow rate of the fluid based on the ultrasonic signals transmitted and received through the fluid of the tube.

A consumption meters with multiple independent flow meters will be capable of measuring multiple sub-flow rates. This has the advantage that the sub-flow rates are measured over multiple paths of propagation whereby multiple signals indicative of sub-flow rates are generated. The individual flow meters are preferably each arranged to transmit and receive ultrasonic signals propagating over a path different from the path of the other individual flow meters. Each signal indicative of a sub flow rate provides information regarding the flow rate in the tube. The multiple signals indicative of sub-flow rates have the advantage that the first control circuit can generate an improved signal indicative of the flow rate in the tube by combining the multiple sub-flow rates. In other words the first control circuit is arranged for generating an improved or more accurate signal indicative flow rate of the fluid based on the received sub-flow rates. Especially, the first control circuit will be enabled to generate a more precise signal indicative of the flow rate in case of layered flow in the tube by combining multiple signals indicative of a sub-flow rate. The signals indicative of any flow rate may express the flow rate as volume per time or as a series of accumulated volumes.

The flow meter housings may be a water tight and/or sealed enclosure, which is advantageous in that the consumption meter thereby is suitable for operation in a humid environment or even for submerged operation. The multiple individual water tight and/or sealed flow meters are especially advantageous in that water penetrating into one flow meter cannot spread from that flow meter to other parts of the consumption meter through connections such as cables. If one flow meter is damaged due to humidity, the other flow meters may continue to operate. And the first control circuit may be arranged to generate an improved or more accurate signal indicative of the flow rate based on the sub-flow rates received from the flow meters still operating.

Each of the multiple individual flow meters may further comprise a battery which has the advantage that the flow meter is one self-contained unit cable of operation independent of other devices. Further the modular flow meters has the advantage that they may be preproduced, placed on stock and mounted on the consumption meter upon order from a customer. As an alternative to having a battery in each flow meter energy may be coupled into the flow meter over a inductive coupled interface, in particular a resonant inductive coupling.

The communication interface may be a non-galvanic coupled communication interface. A consumption meter with multiple individual flow meters without any cables or galvanic connections entering the flow meter housings or meter housing has the advantage that the consumption meter is robust and there is no risk of water entering any of the housings through cables or cable openings. Further, if water enters one housing it will not travel from housing to housing through the cables, meaning that the consumption meter may continue operation with a reduced number of flow meters. In other words the flow meters are self-contained sealed and/or water tight without cables or other galvanic connections running through a wall of the flow meter housing. Thus the flow meters are arranged to have no galvanic connection between an inside of the flow meter housing and an outside of the flow meter housing. Thus the flow meter housing provides electrical isolation between an inside of the flow meter housing and an outside of the flow meter housing. The flow meter housing being sealed and/or water tight is to be construed as a flow meter housing having no openings in the flow meter housing allowing for water ingress and mechanical connection between different parts of the flow meter housing is sealed by sealing means or connected by gluing or welding to prevent water ingress. In other words the flow meter housing is hermetically sealed/hermetically closed. Thus, the flow meter housing is a sealed and water tight enclosure arranged to prevent water ingress into the interior of the meter housing. A non-galvanic coupled interface is to be understood as and may be any wireless communication interface, especially communication interfaces using electromagnetic radiation or fields for communication. As an alternative, the communication interface may use sound waves for transmission of data, in particular the ultrasonic transducers may be used for receiving and transmitting sound waves carrying data information between the flow meters through the fluid in the tube.

The communication interface may be a wireless communication interface such as an RF communication interface or an optical communication interface. AN RF interface is especially advantageous in that no special communication media is required in that the RF signals may propagate over the air. Alternatively external antennas or cables or wave guiding structures may be provided for leading or guiding the RF signals between the communication interfaces.

The consumption meter may be provided with a communication interface which is inductively or capacitively coupled communication interface. An inductive or capacitive communication interface is advantageous, in that communication over the interface is possible without radiating any significant amount of energy such as RF signals to the surroundings. The coupling between an internal coil and an external coil may be provided whereby an electromagnetic signal may be transferred over the inductive communication interface. This has the advantage of reduced or easier approval processes. A capacitive coupling comprising a capacitive coupling plate element, will have similar advantages. Further, inductive capacitive, RF and optical communication interfaces all have the advantage of being non-galvanic coupled i.e. no electrical connection, such as cables or connectors, between first and second control interfaces is required.

The communication interfaces may all be connected by a single communication line constituting a communication bus interconnecting the communication interfaces of the first control circuit and the multiple individual flow meters. A communication bus has the advantage that all units of the consumption meter comprising a communication interface coupled to the bus may communicate with each other in a peer to peer communication session.

The consumption meter may be arranged such that the flow meters are substantially equally distributed around the circumference of the tube. Alternatively the flow meters may be unevenly distributed around the circumference of the tube. The flow meters may be arranged on the same longitudinal section of the tube in order to make the sub-flow rates cover the same longitudinal section of the tube. Covering the same longitudinal section has the advantage that the different paths of propagation of the ultrasonic signal provide measures of multiple sub-flow rates within the same longitudinal section of the tube which improves the accuracy of the signal indicative of the flow rate provided by the first control circuit. The longitudinal direction of the tube is defined by/along a line extending between the centre of the inlet and the centre of the outlet of the tube. Alternatively the flow meters may be arranged on at least overlapping longitudinal sections of the tube.

As an alternative the flow meters may be arranged at different/non-overlapping longitudinal sections of the tube.

The first control circuit may be embedded in one of the flow meter housings. This has the advantage of reducing the number of housings in that the first control circuit does not require its own housing. A further advantage is that no extra housing needs to be mounted on the consumption meter. The flow meter housing in which the first control circuit is embedded may have another form factor than the housings of the remaining flow meters.

The first control circuit and the second control circuit of one of the multiple independent flow meters may further share a common communication interface.

The consumption meter may be arranged such that the flow meter housing has a part extending into a transducer hole in a wall of the tube. This has the advantage of creating a direct interface between the flow meter housing which comprises the ultrasonic transducers and the fluid in the tube, whereby the ultrasonic signals may be coupled directly between the transducers and the fluid in the tube. A wall of the flow meter housing may provide a resonance window or a membrane between transducer and fluid.

The consumption meter may have a flow meter housing which comprises a main housing and a transducer housing, wherein the transducer housing is mounted on an inner wall of the tube and has a part extending into a transducer hole in the wall of the tube and the main housing is mounted on the part extending into the transducer hole to constitute a water tight and/or sealed enclosure. The transducer housing is fixated to a wall of the tube and may comprise an internal transducer housing element and an internal transducer housing element arranged to engage through the transducer hole in a wall of the tube whereby the transducer housing is fixated to the tube. This arrangement has the advantage that the flow meter housing may be mounted on a standard prefabricated tube such as a seamless tube or a welded tube. The standard tube only need to have transducer holes cut in a wall and flanges created at the tube endings to be suitable for the purpose.

The first control circuit may further be arranged to allocate measurement time slots for each of the flow meters by communicating at least one measurement timeslot to each flow meter through the communication interface, the measurement time slots for each flow meter are arranged such that measurements will be performed at different points of time, whereby none of the flow meters will perform a flow measurement at the same time.

In other words the first control circuit may be arranged to control the measurement timing of each of the flow meters via the communication interface and/or the communication bus such that the flow meters do not measure sub flow rates simultaneously.

The flow meters may as such be synchronized by the first control circuit and controlled to avoid simultaneously sub flow rate measurements.

This has the effect that ultrasonic signals from one flow meter doing a sub flow rate measurement does not disturb the ultrasonic measurement of another flow meter doing a sub flow rate measurement simultaneously.

As an alternative, flow meters may be arranged to measure the flow at random time points. Further, the flow meter may be arranged to detect ultrasonic measurement signals from other flow meters and to discard flow measurements colliding in time with flow measurements made by other flow meters. This has the advantage that the consumption meter requires no synchronization mechanism between the flow meters.

Further the consumption meter may comprise a sleeve arranged inside the tube. The sleeve is arranged to reduce the diameter of the tube. This means that the diameter of the cavity of the flow tube is reduced whereby the flow speed is increased. Further the sleeve may be produced with lower tolerances on the inner diameter than the tube, whereby measurement precision is increased. This is especially advantageous if the tube is made using a standard prefabricated tube in that the diameter of the tube may vary slightly between tubes. This has the effect prefabricated standard tubes with a poorer precision on the tube diameter may be used.

The consumption meter may further include a display controlled by the first control circuit to display consumption data. The display may be embedded in one of the flow meter housings.

BRIEF DESCRIPTION OF THE FIGURES

The consumption meter, according to the invention, will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
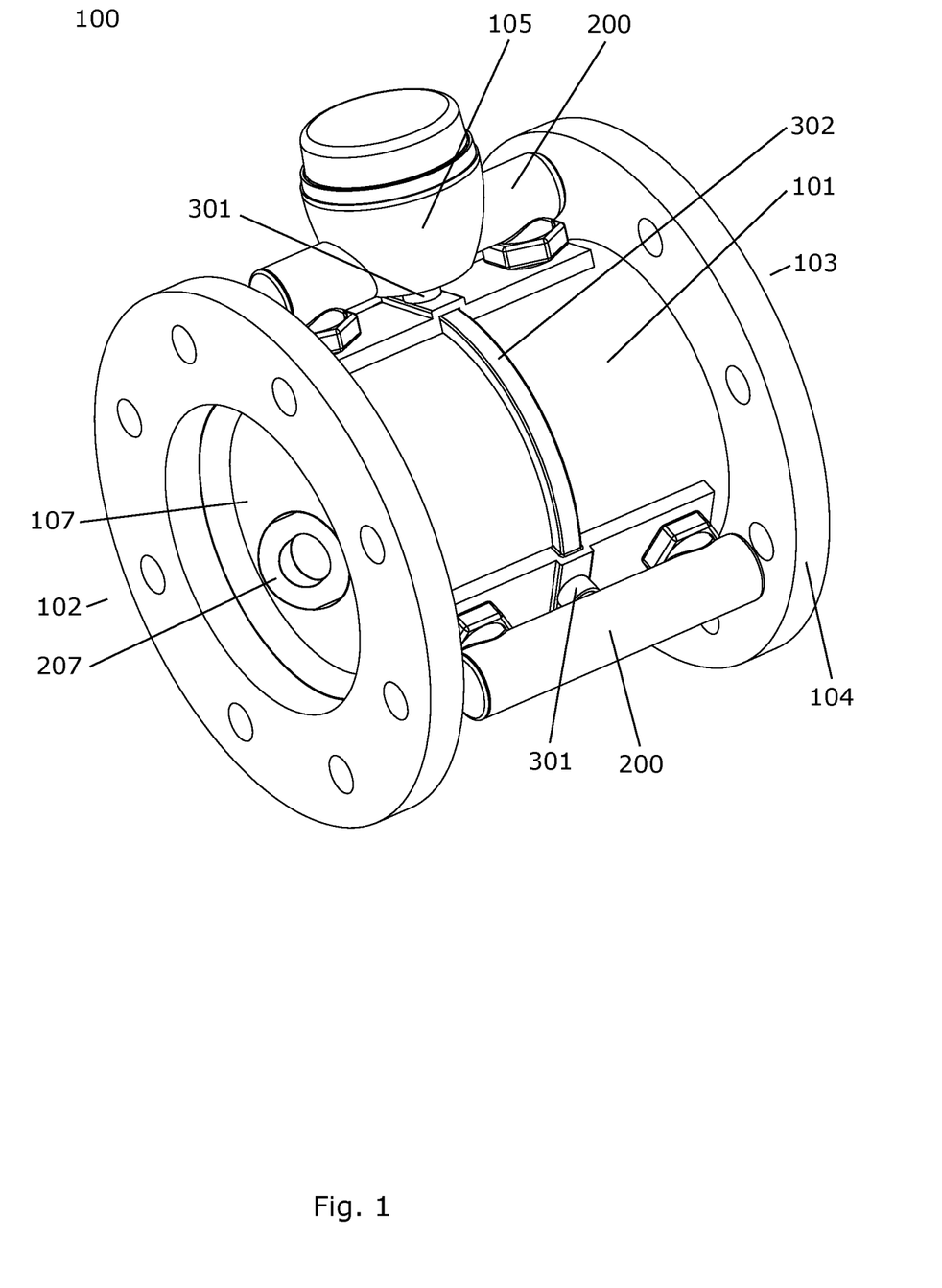
FIG. 1 illustrates a consumption meter with three individual flow meters.

Now referring to FIG. 1, a modular consumption meter 100, comprising three individual ultrasonic flow meters 200, a first control circuit and an communication line 302 is described.

The consumption meter further comprises a tube 101 with an inlet 102 and an outlet 103, a cavity for conducting a fluid and flanges 104 arranged at each end of the tube for connecting the consumption meter to the piping of an installation site.

Figure 2A:
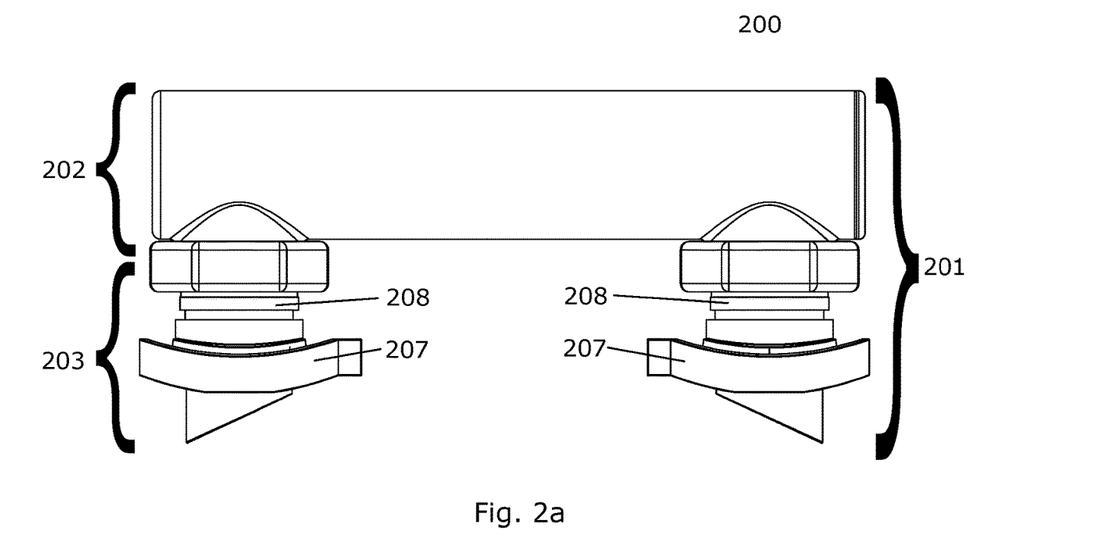
FIGS. 2a and 2b illustrate an individual flow meter housing in a closed version and a cut open version.
Figure 2B:
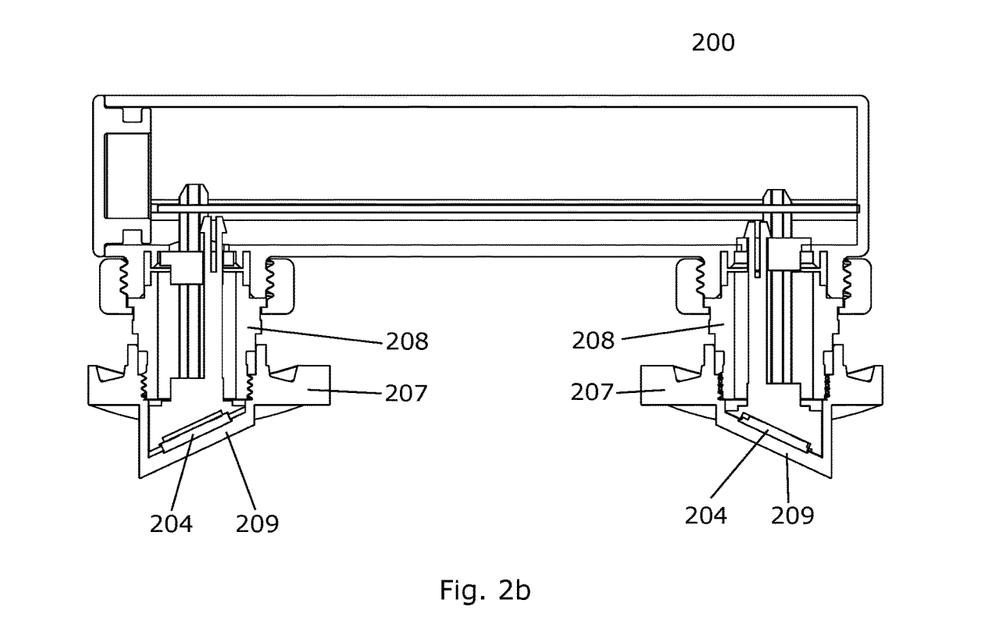

The individual flow meters each comprise a sealed and water tight flow meter housing 201, a set of ultrasonic transducers 204, a second control circuit, a battery and an inductive communication interface, where the sealed and water tight flow meter housing 201 is arranged to enclose the others. The flow meters are arranged to inductively couple to the communication line 302 arranged on an outer surface of the tube 101. The flow meters are self-contained sealed and water tight without cables or connections running through the flow meter housing, hereby a robust modular construction is achieved.

The first control circuit of the consumption meter is arranged in a meter housing 105, which is embedded in or integrated with one of the flow meters 200. The ultrasonic flow meters are arranged to measure a sub-flow rate of the fluid flowing through the cavity of the tube and generate a signal indicative of the sub-flow rate and communicate this signal to the first control circuit. The first control circuit is arranged to receive the signals indicative of the sub-flow rates and to generate a signal indicative of the flow rate of the fluid in the tube according to the received sub-flow rates.

The individual flow meters 200 are arranged at the tube and distributed over the circumference of the tube, whereby different sections of the cavity of the tube is covered by the different flow meters. As the flow may be different in different sections of the tube, a more accurate measurement of the flow is obtained by combining sub-flow measurements covering different sections of the tube.

Especially for large dimension consumption meters, flow rates within the cavity of the tube may vary significantly between different sections of the cavity. This is often described as a flow profile. The flow profile is dynamic depending among other parameters on flow rate, pressure and temperature.

For large dimension flow meters layered flow may occur especially at low flow rates where the fluid may be layered due to temperature differences of the fluid, causing the flow velocity to be different between sections of the cavity. The layers having different temperature will have different flow velocities.

The piping of the installation to which the consumption meter is connected may influence the flow in the tube as well as leading to an unpredictable flow profile.

Ultrasonic flow meters measure the flow rate in a path of propagation of the ultrasonic signal from one ultrasonic transducer through the fluid to another ultrasonic transducer. This means that only the flow velocity of the fluid within sections of the cavity covered by the path of propagation is included in the measurement. To ensure sufficient accuracy of the flow measurement, multiple sub-flow measurements having different paths of propagation is performed. The sub-flow measurements are performed by the individual flow meters, which are distributed over the circumference of the tube, to cover different sections of the cavity.

The use of multiple flow meters is especially relevant for larger scale flow meters. The tube may have a diameter in the range of 4-48 inches and be arranged to measure flowrates up to 1200 M3/h.

The flow meters may be evenly distributed over the circumference of the tube or they may have another distribution in order to optimize flow metering.

The number of flow meters depends on the size of the tube and the required accuracy and the flow profile. A typical consumption meter may comprise up to 5 flow meters but for large scale high precision consumption meters up to 10 flow meters may be required to achieve a desired accuracy.

The flow meters are ultrasonic flow meters of the transit time flow meter type arranged to measure a flow rate of a fluid flowing in the tube by use of the known operation principle for transit time flow meters, where ultrasonic signals are emitted at one ultrasonic transducer and received at the other ultrasonic transducer, and where the difference in time-of-arrival between oppositely propagating signals is measured and converted into a flow rate. Ultrasonic flow meters using the transit time or time of flight principle are well known within the art.

The flow meters 200 each comprise two ultrasonic transducers 204, such as piezoelectric transducers which are operated by a second control circuit also comprised by the flow meter. Based on the involved signals the second control circuit generates a signal or value indicative of the flow rate of the fluid in the tube.

The flow meters further comprises a battery enclosed by the flow meter housing and are as such self-contained requiring no galvanic connection to other elements or an external power supply. The flow meter is enclosed in a water tight flow meter housing 201. All elements of the flow meter including the ultrasonic transducers 204 are enclosed by the flow meter housing 201. The flow meter housing comprises no openings allowing for water ingress and mechanical connections between parts of the flow meter housing are sealed by sealing means such as O-rings, gaskets or other sealing means. Alternatively parts of the flow meter housing may be mechanically connected to prevent water ingress by use of gluing, welding, soldering or other suitable techniques.

Figure 3:
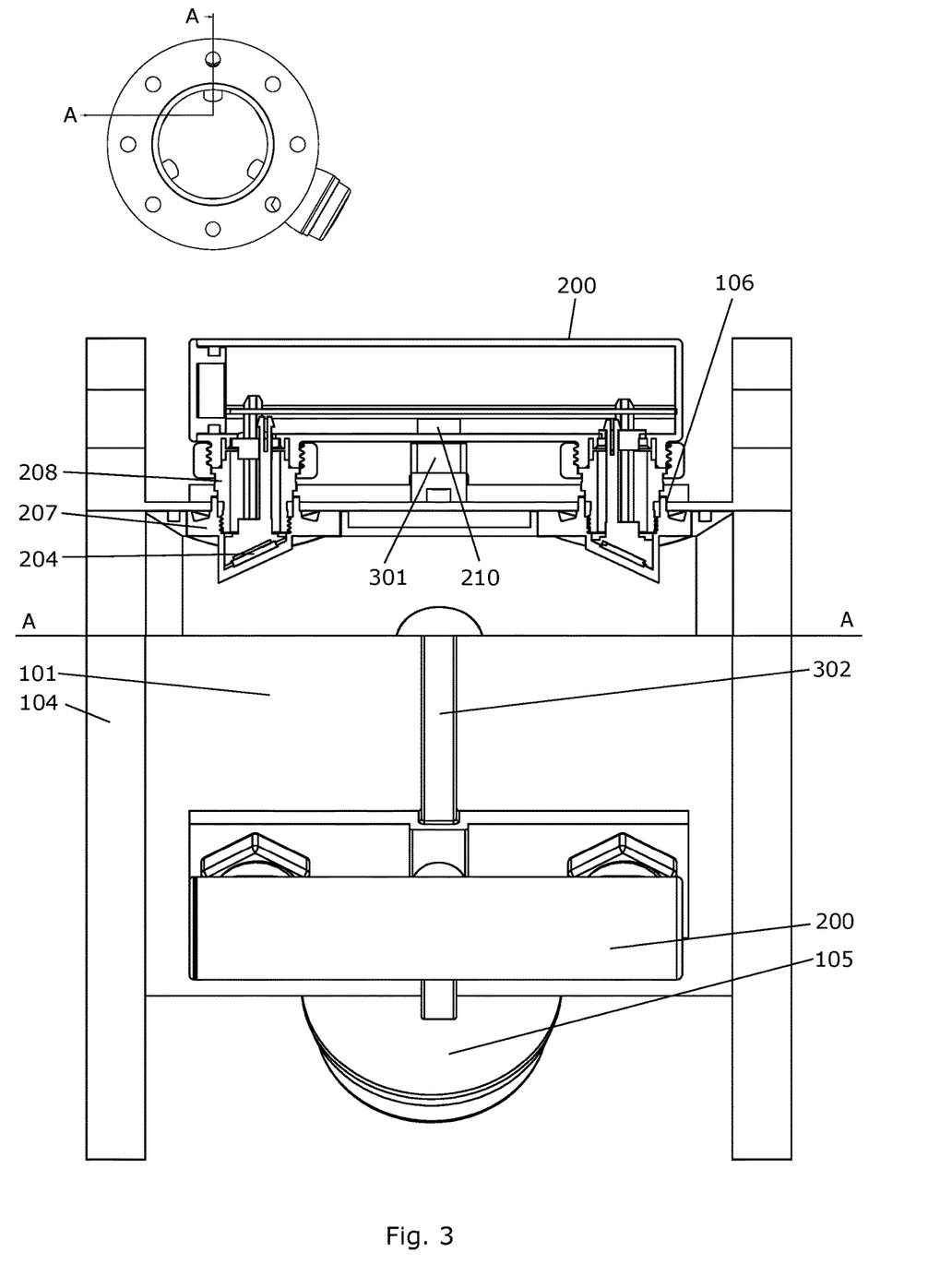
FIG. 3 illustrates a consumption meter with a cut open section showing a flow meter installed on the tube.

The flow meter housing 201 comprises a main housing 202 and a transducer housing 203. The two parts of the housing are connected/engaged by a sealed water tight connection. The flow meters 200 are arranged at the tube 101. The tube has transducer holes 106 arranged for receiving the flow meter housing such that the transducer housing extends into the transducer holes whereby contact to the fluid in the tube is created. The transducer housing 203 comprises an internal transducer housing element 207 arranged at an inner surface of the tube 101 and an external transducer housing element 208 arranged at an outer surface of the tube. The internal transducer housing element 207 and the external transducer housing element 208 are arranged to engage through the transducer holes 106 in the wall of the tube 101, such that the transducer housing 203 is fixated to the tube. The two elements of the transducer housing are connected/engaged by a sealed water tight connection. The main housing 202 is arranged to engage with the external transducer housing element to constitute a closed and sealed water tight flow meter housing 201.

All elements of the of the flow meter housing 201 are connected or engaged using sealing means such as O-rings or gaskets. The sealing means may be made from rubber or fiber materials. Further, sealing means are provided between the internal transducer housing element and the inner surface of the tube, to prevent fluid flowing from the tube through the transducer holes. The sealing means are not shown on the figures.

The ultrasonic transducers 204 are excited by the second control circuit to generate an ultrasonic signal which penetrates the internal transducer housing element 207 and propagates into the fluid in the tube. The internal transducer housing element 207 constitutes a resonance window 209 between the ultrasonic transducer and the fluid in tube. The resonance window ensures acoustic impedance matching between the ultrasonic transducers and the fluid in the tube. As an alternative to the resonance window the internal transducer housing may comprise a membrane, such as a metal membrane, shielding the ultrasonic transducers from the fluid within the tube.

The ultrasonic transducers 204 of one flow meter are arranged at the same side of the tube 101. The transducers do not point directly at each other and propagation of the ultrasonic signals in the tube is be based on reflections. The signals are reflected by reflectors arranged inside the tube.

Further the transducers are angled relative to a centre line of the tube in an non-perpendicular angle. As an alternative to reflectors the ultrasonic signals may be reflected by the inner wall of the tube. As an alternative to a non-perpendicular angling of the ultrasonic transducers the reflectors may be angled. The use of reflectors inside the tube and angling of ultrasonic transducers and reflectors are well known within the art.

The flow meter housing elements are made from a polymer material or alternatively a composite material. As an alternative, the flow meter housing or parts of the housing may be made from a metal such as stainless steel, brass or another suitable metal.

The flow meter housing elements may be made from a polymeric material selected from, but is not limited to, the group consisting of polyphenylene sulphide (PPS), polyether sulphone (PES) and Polyether Sulphone (PSU).

It is noted that the properties of the polymeric materials can be customized by adding certain additives prior to the molding process, affecting the material properties such as stiffness, density or the acoustic impedance. Examples of potential additives include reinforcement materials such as glass fibers, density increasing fillers such as chalk (calcium carbonate, $CaCO_3$) or powdery stainless steel raising the acoustic impedance of the material.

The flow meters further comprise a communication interface for transmitting the measured signal indicative of the sub-flow rate to the first control circuit. The communication interface is an inductive coupled communication interface requiring no galvanic connection, thus, no wires are required to enter the flow meter housing to support the communication interface. The communication interface comprises an internal coil 210 inside the flow meter housing 201 arranged to inductively couple to an external coil 301 of the communication line 302 interconnecting the flow meters 200 and the first control circuit.

The communication interface is a two way communication interface and may be used for communicating other data than the sub-flow rates such as configuration data and synchronization data for controlling the measurement of the sub-flow rates. Further SW updates and general configuration of the flow meter may be communicated over the communication interface. In a simplified version the communication interface may be a one way communication interface in which the flow meters only transmit data to the first control circuit.

When the flow meter transmits data, the communication interface modulates data, such as the data relating to the sub-flow rate, on a carrier signal to create a modulated signal. The modulated signal is inductively coupled from the internal coil 210 to the external coil 301 of the communication line 302. The signal propagates over the communication line to another external coil 301 which is inductively coupled to the internal coil of the communication interface of another flow meter and/or the first control circuit. The communication interface receives the signal inductively coupled from the external coil to the internal coil and demodulates the signal to extract the data content.

The carrier signal has a frequency of 200 kHz. Any appropriate carrier frequency may be selected. Especially carrier frequencies in the range from 32 kHz to 500 KHz has the advantage that the signal may be modulated by a standard micro controller unit while the coils for the inductive coupling are kept relatively small and the current consumption of the microcontroller is at the same time kept low. The modulation used is On Off Keying (OOK) but any modulation scheme such as Frequency Shift Keying (FSK), Phase Shift Keying (PSK), Amplitude Shift Keying (ASK) may be used as well as analogue modulation schemes. The signal is modulated with a data rate of 1200 baud but alternative baud rates in the range from 110 to 19200 baud or even up to 100000 baud may be used depending on the carrier frequency, modulation scheme and inductive coupling circuit.

Simple asynchronous communication using start and stop bits may be used on the physical layer. A link layer protocol including a data integrity check is included to ensure data integrity. Transport layer protocols may be included to prevent data loss over the communication link. Further protocol layers may be added to secure authenticity and confidentiality of data. Further the first control circuit may perform a discovery process to identify all flow meters connected to the communication line or alternatively identification of flow meters are configured to the first control circuit. Data communication protocols are well known to the skilled person and selection of protocols offering a sufficient quality of services is routine work.

The modulated signal is generated (modulated) and detected (demodulated) by a standard micro controller interfacing the coil directly or through one or more amplifying circuits and filtering circuits. Alternatively dedicated communication circuits or chips may be used.

The coils are matched to the carrier frequency to create a resonant coupling between the coil of the inductive communication interface and the communication line. The internal coil 210 of the flow meter is implemented in a conducting layer of a Printed Circuit Board (PCB) of the second control circuit. Alternatively the coil may be a wire wound coil mounted inside the flow meter housing either directly on the PCB or connected to the PCB.

The communication line 302 comprises multiple external coils 301 arranged for coupling with the internal coils 210 of the flow meters and/or the first control circuit.

Inductive communication interfaces are well known to the skilled person and several types of Near-field magnetic induction (NFMI) communication systems may be used for the inductive communication interface. Examples of such technologies include standardized technologies such as NFC, RFID, IO-Link or proprietary technologies as disclosed in EP1866605, EP1393281, EP0131732.

As an alternative to the inductive communication interface between the flow meters and the first control circuit, a wireless communication interface using Radio Frequency communication may be used. The RF communication may be according to a communication standard such as the wireless MBus standard (EN13757-4 2013), Zigbee, KNX or Bluetooth or a proprietary communication protocol. As yet another alternative, the communication interface may be capacitive coupled or be optical communication interface. An essential characteristics of the communication interface is that there is no need for a wired (i.e. galvanic) connection into the flow meter housing.

The communication link may further be used for transferring energy between the flow meters or between the flow meters and the first control circuit to eliminate the requirement for batteries in all parts. Energy transfer over an inductive interface is also well known and described in the context of the abovementioned inductive communication interfaces.

The first control circuit is arranged to receive all the signals indicative of sub-flow rates from the flow meters to generate a signal indicative of the flow rate of the fluid in the tube according to the received sub-flow rates. The Signal indicative of the flow rate is based on calculations performed on the received sub-flow rates. The flow rate is calculated as an average of all the sub-flow rates so that the flow rate equals the mean flow rate. Alternative calculations of the flow rate may be performed using more advanced methods or statistical methods. Especially sub-flow rates deviating significantly from the previous or following sub-flow rate or the average flow rate may be discarded to reduce the influence of incorrect measured sub-flow rates.

The first control circuit is arranged to continue the flow calculation even if sub-flow rates is not received from one or more of the flow meters, as long as at least one sub-flow rate is received. The consumption meter may be approved by relevant national or regional authorities to measure consumption and/or flow rates according to different standards, approvals or accuracy requirements depending on the number of active flow meters.

The flow measurements performed by the individual flow meters may in its simplest form be performed at random time points. Collisions in time of measurements by different flow meters may however occur, which may disturb the measurements. Such disturbed measurements may be detected and discarded as described above.

Alternatively to avoid collisions, the flow meters may be synchronized to avoid two flow meters measuring at the same point of time. The first control circuit controls the timing of the consumption meter and comprises a timer unit including a continuously running timer. The first control circuit sends a time synchronization signal to each of the flow meters, wherein it is received by the second control circuit which also comprises a timer unit and a continuously running timer. Further, the first control circuit allocates measurement time slots to each of the flow meters. The measurement time slots are communicated to each meter through the communication interface as well. The time slots for each flow meter are arranged such that measurements will be performed at different points of time, i.e. no two of the flow meters will perform a flow measurement at the same time.

In an alternative simpler approach, collisions of measurements are avoided in that the first control circuit is arranged to transmit a request for measurement signal on the communication interface. The request for measurement signal being addressed individually for each of the flow meters and when received by the addressed flow meter a flow measurement is initiated and the resulting signal indicative of the sub-flow rate is transmitted to the first control circuit subsequently.

As illustrated in FIG. 1, the first control circuit of the consumption meter is arranged in a meter housing 105, which is embedded in or integrated with one of the flow meter housings to become a combined housing. The first control circuit and the flow meter as such becomes a combined unit. The first control circuit shares communication interface, battery and other common parts with the flow meter whit which it is integrated to become a combined unit. Communication between the first control circuit and the second control circuit of the combined unit need not to be coupled to the communication line which may be by passed internally in the combined housing. The combined unit may share further elements such as printed circuit board, micro controller, power supply unit etc. In this way, the first control circuit and the second control circuit of the combined unit may become one combined circuit.

As an alternative the meter housing may be a separate housing arranged on the consumption meter or as an external element arranged away from the consumption meter. It is however required that the first control circuit arranged in the meter housing has access to the communication link.

The consumption meter may further comprise a display controlled by the first control circuit. The display may be integrated in the meter housing or be an external display.

The tube is made from a standard prefabricated tube such as a seamless/extruded tube or a welded tube. Flanges 104 are welded at the tube endings and transducer holes are cut in the tube wall e.g. by laser cutting. Alternatively or additionally the tube endings may be formed/machined or milled to create flange endings.

The standard tube may be, but is not limited to, a standard tubes designed and produced according to EN ISO 1127:1997 or ANSI/ASME B 36.19:2004 or ASTM A 530:2018 or ASTM B677:2016

The tube is made of a metal alloy such as brass, red brass, stainless steel, cast iron or other suitable alloys.

In an alternative embodiment the tube may be made from a polymer.

A sleeve 107 is arranged inside the tube. The sleeve reduces the inner diameter of the tube 101. The sleeve has holes arranged to match the transducer holes in the tube. The transducer housings 207, 208 extend into the holes in the sleeve. The sleeve fixates the internal transducer housing element 207 to prevent rotation around the centre point of the transducer holes. Sealing means are arranged between an outer surface of the sleeve and the inner surface of the tube, to minimize flow in the space between the sleeve and the tube. Reflectors for reflecting ultrasonic signals are arranged on an inner surface of the sleeve. As an alternative, the sleeve may only extend in a section between the transducer holes, in that case no holes for the transducer housings are needed.

The consumption meter may be any type of utility meter such as a water meter for cold and/or hot water, gas meter, heat meter, cooling meter, energy meter or smart meter. The consumption meter may be used in connection with district heating, district cooling and/or distributed water supply. A energy meter may include one or more temperature sensors to calculate the thermal energy in the fluid flowing through the tube into and/or out of a consumption site whereby the energy consumption can be calculated.

The consumption meter may be a legal meter, i.e. a meter which is subdued to regulatory demands. Such regulatory demands may be demands to the precision of the measurements.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A consumption meter arranged to measure a flow rate of a fluid, the consumption meter comprising:
    a tube with a through-going opening for passage of the fluid between an inlet and an outlet;
    multiple individual flow meters arranged at the tube to generate a signal indicative a sub-flow rate of the fluid; and
    a first control circuit comprising a communication interface arranged for receiving the signal indicative of the sub-flow rate from each of the multiple flow meters, and being arranged to generate a signal indicative of the flow rate of the fluid according to the received sub-flow rates, each of the multiple individual flow meters comprising:
        a flow meter housing arranged at the tube;
        first and second ultrasonic transducers arranged in the flow meter housing for transmitting and receiving ultrasonic signals propagating through the fluid;
        a second control circuit arranged for operating the first and second ultrasonic transducers, and being arranged to generate the signal indicative of the sub-flow rate of the fluid accordingly; and
        a communication interface arranged for transmitting the signal indicative of the sub-flow rate to the first control circuit,
    wherein the flow meters are arranged on the same longitudinal section of the tube or on at least overlapping longitudinal sections of the tube.

2. A consumption meter according to claim 1, wherein the flow meter housing is a water tight and/or sealed enclosure.

3. A consumption meter according to claim 1, wherein each of the multiple individual flow meters further comprise a battery.

4. A consumption meter according to claim 1, wherein the communication interface is a non-galvanic coupled communication interface.

5. A consumption meter according to claim 1, wherein the communication interface is a wireless communication interface such as a RF communication interface or an optical communication interface.

6. A consumption meter according to claim 1, wherein the communication interface is a inductively or capacitively coupled communication interface.

7. A consumption meter according to claim 1, further comprising a communication bus interconnecting the communication interfaces of the first control circuit and the multiple individual flow meters.

8. A consumption meter according to claim 1, wherein the flow meters are substantially equally distributed around a circumference of the tube.

9. A consumption meter according to claim 1, wherein the first control circuit is embedded in one of the flow meter housings.

10. A consumption meter according to claim 1, wherein the first control circuit and the second control circuit of one of the multiple independent flow meters share a common communication interface.

11. A consumption meter according to claim 1, wherein the flow meter housing has a part extending into a transducer hole in a wall of the tube.

12. A consumption meter according to claim 1, wherein the flow meter housing comprises a main housing and a transducer housing, wherein the transducer housing is mounted on an inner wall of the tube and has a part extending into a transducer hole in the wall of the tube and the main housing is mounted on the part extending into the transducer hole to constitute a water tight and/or sealed enclosure.

13. A consumption meter according to claim 1, wherein the first control circuit is arranged to control the measurement timing of each of the flow meters via the communication interface and/or the communication bus, such that the flow meters do not measure simultaneously.

14. A consumption meter according to claim 1, wherein the first control circuit is arranged to allocate measurement time slots to each of the flow meters by communicating at least one measurement timeslot to each flow meter through the communication interface, the measurement time slots for each flow meter are arranged such that measurements will be performed at different points of time, whereby none of the flow meters will perform a flow measurement at the same time.

15. A consumption meter according to claim 1, further including a display controlled by the first control circuit to display consumption data.

* * * * *